United States Patent Office 3,732,225
Patented May 8, 1973

3,732,225
PYRAZOLO[3,4-d]PYRIMIDINE DERIVATIVES
Hermann Breuer, Burgweinting, and Uwe D. Treuner and
Ernst Schulze, Regensburg, Germany, assignors to E. R.
Squibb & Sons, Inc., New York, N.Y.
No Drawing. Filed July 23, 1970, Ser. No. 57,828
Int. Cl. C07d 5/46
U.S. Cl. 260—256.4 F                    4 Claims

ABSTRACT OF THE DISCLOSURE

New pyrazolo[3,4-d]pyrimidine derivatives which have the formula

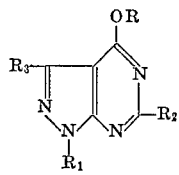

wherein R is hydrogen or lower alkyl, $R_1$ is lower alkyl, cycloalkyl, phenyl or substituted phenyl, $R_2$ is cycloalkyl, phenyl or substituted phenyl and $R_3$ is hydrogen, lower alkyl, cycloalkyl, phenyl or substituted phenyl, and salts thereof, are useful as hypoglycemic agents and anti-inflammatory agents.

SUMMARY OF THE INVENTION

This invention relates to new pyrazolo[3,4-d]pyrimidine derivatives which have the formula (I)

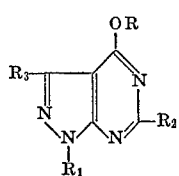

and salts thereof.

The symbols have the following meanings in Formula I and throughout this specification.

R is hydrogen or lower alkyl, $R_1$ is lower alkyl, cycloalkyl, phenyl or substituted phenyl, $R_2$ is phenyl, substituted phenyl or cycloalkyl and $R_3$ is hydrogen, lower alkyl, cycloalkyl, phenyl or substituted phenyl. The lower alkyl groups represented by R and $R_1$ are straight or branched chain hydrocarbon groups of up to seven carbon atoms, e.g., methyl, ethyl, propyl, butyl, t-butyl and the like, methyl and ethyl being preferred. The cycloalkyl groups are cyclo-lower alkyl groups of three to seven carbon atoms, especially cyclohexyl. The substituted phenyl groups, i.e., $R_4$-phenyl, are those bearing a halogen, preferably chlorine or bromine, a lower alkyl group of the type referred to previously, preferably methyl or ethyl, or a lower alkoxy group, e.g., methoxy, ethoxy or the like, in one of the positions on the ring.

Preferred are those compounds wherein R is lower alkyl, especially ethyl, $R_1$ is methyl and $R_2$ is phenyl, chlorophenyl, especially p-chlorophenyl, or cyclohexyl and $R_3$ is hydrogen or lower alkyl, especially the first.

When R is hydrogen, the compounds of Formula I may tautomerize so that the tautomeric variations of such compounds are also within the scope of the invention.

The compounds of Formula I form salts with strong acids and these are also within the scope of the invention.

DETAILED DESCRIPTION OF THE INVENTION

The compounds of Formula I are derived from intermediates of the formula (II)

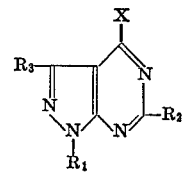

wherein X is halogen, preferably chlorine, and $R_1$, $R_2$ and $R_3$ are as defined previously, by treating such an intermediate with an alkali metal alkoxide such as sodium methylate, sodium ethylate and the like in an alcohol having the same alkyl group, e.g., methanol, ethanol, etc., or in an inert solvent like benzene, toluene, dimethylformamide or dimethylsulfoxide. This produces a compound of Formula I wherein R is a lower alkyl group (corresponding to the alkyl group of the alkali metal alkoxide) and $R_1$, $R_2$ and $R_3$ are the same groups as in the intermediate of Formula II.

This product may be converted to one in which R is hydrogen (or its tautomeric keto form) by hydrolysis with a hydrohalic acid such as hydrobromic or hydroiodic acid.

The intermediate of Formula II may be derived by several synthetic routes. The following reaction sequence is illustrative of one method of synthesis. It will be appreciated that the particular reactant, reagent or medium indicated is illustrative and is not the only one which may be used, but common variants may also be used.

The symbols, R, $R_1$, $R_2$ and $R_3$ have the meanings already defined.

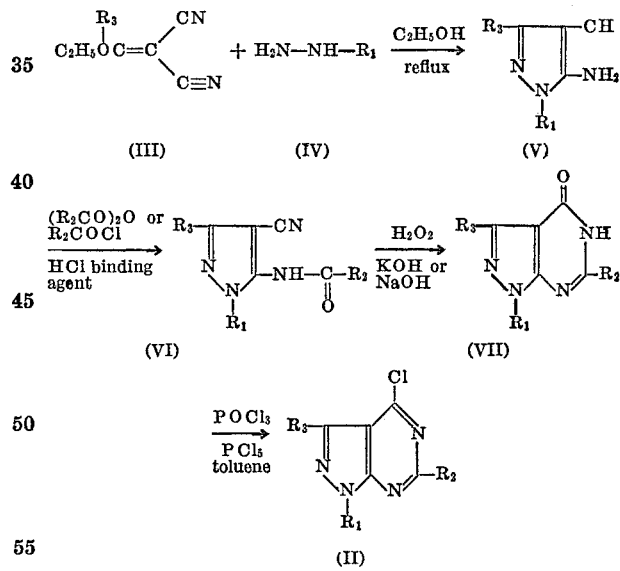

An alternate synthesis of an intermediate of Formula VII includes the following reaction sequence:

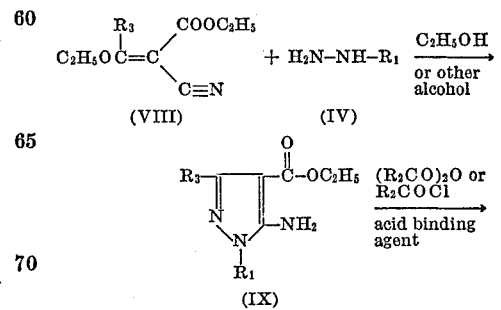

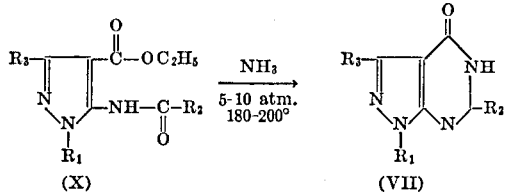

The compound of Formula VII is then treated with POCl₃ and PCl₅ as in the previous method.

According to still another alternative a compound of Formula V is converted to a compound of Formula VII as follows:

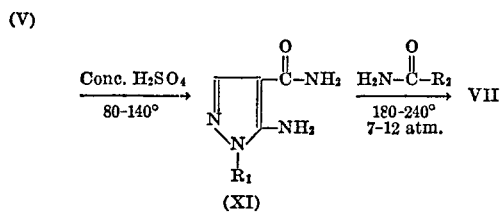

and the compound of Formula VII is further treated with POCl₃ and PCl₅ as above.

The compounds of Formula I form acid addition salts with strong organic or inorganic acids, e.g., hydrohalic acids, especially hydrochloric and hydrobormic acids, sulfuric acid, nitric acid, phosphoric acid, methanesulfonic acid, toluenesulfonic acid, etc. These are formed by reacting the base with an equivalent amount or excess of the acid. These salts frequently provide a means of isolating the product, e.g., by forming the salt in a solvent in which it is insoluble. The isolated salt may then be converted to the free base, e.g., by neutralization with a base such as sodium or barium hydroxide, and, if desired, another salt then may be formed.

The new compounds of this invention have anti-inflammatory properties and are useful as anti-inflammatory agents, for example, to reduce local inflammatory conditions such as those of an edematous nature or resulting from proliferation of connective tissue in various mammalian species such as rats, dogs and the like when given orally in dosages of about 5 to 50 mg./kg./day, preferably 5 to 25 mg./kg./day, in single or 2 to 4 divided doses, as indicated by the carageenan edema assay in rats. The active substance may be utilized in compositions such as tablets, capsules, solutions or suspensions containing up to about 300 mg. per unit of dosage of a compound or mixture of compounds of Formula I or physiologically acceptable acid addition salt thereof. They may be compounded in conventional manner with a physiologically acceptable vehicle or carrier, excipient, binder, preservative, stabilizer, flavor, etc. as called for by accepted pharmaceutical practice. Topical preparations containing about 0.01 to 3 percent by weight of active substance in a lotion, salve or cream may also be used.

The compounds of this invention also are hypoglycemic agents which are effective in lowering blood sugar content in mammalian species such as mice, rats, rabbits, dogs or the like in a manner analogous to tolbutamide. Some are particularly noteworthy in their long duration of action. For this purpose a compound or mixture of compounds of Formula I, or non-toxic, physiologically acceptable acid addition salt thereof, may be administered orally or parenterally in a conventional dosage form such as tablet, capsule, injectable or the like. A single dose, or preferably 2 to 4 divided daily doses, provided on a basis of about 1 to 50 mg. per kilogram per day, preferably about 2 to 15 mg. per kilogram per day, is appropriate. These may be conventionally formulated in an oral or parenteral dosage form by compounding about 10 to 250 mg. per unit of dosage with conventional vehicle, excipient, binder, preservative, stabilizer, flavor or the like as called for by accepted pharmaceutical practice.

The following examples are illustrative of the invention. Additional members are produced in the same manner by approprate variations of the groups, R, R₁, R₂ and R₃ in the reactants used. All temperatures are on the centigrade scale.

EXAMPLE 1

1-methyl-4-cyano-5-aminopyrazole

To a solution of 70 grams of 98% methyl hydrazine and 700 ml. of ethanol are added altogether 127 gms. of ethoxymethylene malononitrile in such a manner that the solution remains at the boiling point. After completion of the addition, the reaction mixture is heated to reflux for 30 minutes. The product is permitted to crystallize overnight in the refrigerator. After filtering under suction and washing with a small amount of cold ethanol, 103 gms. of crude 5-amino-4-cyano-1-methylpyrazole remains as yellow crystals, M.P. 216–218°. This product is then used further without recrystallizing.

EXAMPLE 2

1-methyl-4-cyano-5-benzoylaminopyrazole

To a suspension of 6.1 gms. of 1-methyl-4-cyano-5-aminopyrazole in 250 ml. of dioxane are added dropwise 25 ml. of pyridine and 7.3 gms. of benzoyl chloride with vigorous stirring. When all of the benzoyl chloride has been added, the reaction mixture is heated at reflux for 1 hour, whereupon a clear solution results. After the completion of the reaction, the dioxane is distilled off on a rotating steam bath. A yellow viscous residue remains which slowly crystallizes on a clay plate. Recrystallization from methanol yields 7 gms. of 1-methyl-4-cyano-5-benzoylaminopyrazole, M.P. 173–175°.

EXAMPLE 3

1-methyl-6-phenylpyrazolo[3,4-d]pyrimidin-4-one 29 grams of 1-methyl-4-cyano-5-benzoylaminopyrazole, 450 ml. of 3% hydrogen peroxide and 13 gms. of potassium hydroxide are heated for 5 hours at 70–75°. After cooling, the mixture is acidified with glacial acetic acid. A thick white precipitate forms which is washed with ice-water and then recrystallized from ethanol. The 1-methyl-6-phenylpyrazolo[3,4-d]pyrimidin - 4-one melts at 250–252°.

EXAMPLE 4

1-methyl-4-chloro-6-phenylpyrazolo[3,4-d]pyrimidine 2 grams of 1-methyl-6-phenylpyrazolo[3,4-d]pyrimidin-4-one are heated at reflux for 3 hours in 20 ml. of phosphorous oxychloride. The excess phosphorous oxychloride is distilled off and there remains an oil which slowly crystallizes. The crystals are washed with ice-water, dried and recrystallized from cyclohexane. The pure compound melts at 110–111°.

EXAMPLE 5

1-methyl-4-ethoxy-6-phenylpyrazolo[3,4-d]pyrimidine 4.9 gms. of 1-methyl-4-chloro-6-phenylpyrazolo[3,4-d] pyrimidine in 100 ml. of an ethanol solution containing 20 ml. of sodium ethylate are heated at reflux for 30 minutes. After cooling, the mixture is diluted with water whereupon white crystalline 1-methyl-4-ethoxy-6-phenylpyrazolo[3,4-d]pyrimidine precipitates. Upon recrystallization from ethanol, there are obtained white crystals melting at 83–89°. Hydrolysis of this product with 40% hydrogen bromide gives 1-methyl-6-phenyl-1H-pyrazolo [3,4-d]pyrimidin-4-ol, M.P. 250–252°.

EXAMPLE 6

1-methyl-4-cyano-5-(p-chlorobenzoyl)aminopyrazole

By substituting p-chlorobenzoyl chloride for the benzoyl chloride in the procedure of Example 2, there is obtained 1-methyl-4-cyano-5 - (p-chlorobenzoyl)aminopyrazole in the form of white crystals, M.P. 182°.

EXAMPLE 7

1-methyl-6-p-chlorophenylpyrazolo[3,4-d]pyrimidin-4-one

By utilizing the product of Example 6 in the procedure of Example 3, there are obtained white crystals of 1-methyl - 6-p - chlorophenylpyrazolo[3,4-d]pyrimidin-4-one, which are recrystallized from methylene glycol, M.P. 290°.

EXAMPLE 8

1-methyl-4-chloro-6-p-chlorophenylpyrazolo [3,4-d]pyrimidine

By treating the product of Example 7 according to the procedure of Example 4, there is obtained 1-methyl-4-chloro-6 - p-chlorophenylpyrazolo[3,4-d]pyrimidine in the the form of white crystals which are recrystallized from cyclohexane, M.P. 162-164°.

EXAMPLE 9

1-methyl-4-ethoxy-6-p-chlorophenylpyrazolo [3,4-d]pyrimidine

By treating the product of Example 8 according to the procedure of Example 5, 1-methyl-4-ethoxy-6-p-chlorophenylpyrazolo[3,4-d]pyrimidine is obtained as white crystals which are recrystallized from cyclohexane, M.P. 128-129°.

EXAMPLE 10

1-methyl-4-cyano-5-(cyclohexylcarbonyl-amino)pyrazole

By utilizing 1-methyl-4-cyano-5-amino pyrazole and cycyohexanecarbonyl chloride in the procedure of Example 2, 1-methyl-4-cyano-5-(cyclohexylcarbonylamino) pyrazole is obtained as white crystals, which are recrystallized from methanol, M.P. 163-165°.

EXAMPLE 11

1-methyl-6-cyclohexylpyrazolo[3,4-d]pyrimidin-4-one

By treating the product of Example 10 according to the procedure of Example 3, the above product is obtained in the form of white crystals, M.P. 242-244°.

EXAMPLE 12

1-methyl-4-chloro-6-cyclohexylpyrazolo [3,4-d]pyrimidine

By treating the product of Example 11 according to the procedure of Example 4, the above product is obtained as white crystals which are recrystallized from n-hexane, M.P. 96-97°.

EXAMPLE 13

1-methyl-4-ethoxy-6-cyclohexylpyrazolo [3,4-d]pyrimidine

By treating the product of Example 12 according to the procedure of Example 5, 1-methyl-4-ethoxy-6-cyclohexylpyrazolo[3,4-d]pyrimidine is obtained in the form of light yellow crystals, M.P. 47°.

6-cyclohexyl - 1-methyl-1H-pyrazolo[3,4-d]pyrimidin-4-ol is obtained from the foregoing product by hydrolysis with 40% hydrobromic acid, M.P. 242-244°.

The following additional products are obtained by the procedure of Example 5:

|  | R | $R_1$ | $R_2$ | $R_3$ |
|---|---|---|---|---|
| Example: | | | | |
| 14 | $CH_3$ | $CH_3$ | thiophene | thiophene |
| 15 | $C_2H_5$ | thiophene | phenyl | H |
| 16 | $C_2H_5$ | $C_2H_5$ | thiophene | $C_2H_5$ |
| 17 | H | phenyl | phenyl | phenyl |
| 18 | $C_2H_5$ | | Br-phenyl | Br-phenyl, $CH_3$ |
| 19 | $C_2H_5$ | $CH_3$ | $CH_3O$-phenyl | H |
| 20 | $C_2H_5$ | $CH_3$-phenyl | $CH_3$-phenyl | H |

What is claimed is:
1. A compound of the formula

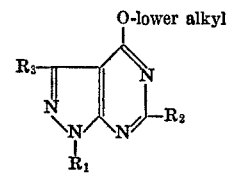

wherein $R_1$ is lower alkyl, cycloalkyl of 3 to 7 carbon atoms or phenyl, $R_2$ is cycloalkyl of 3 to 7 carbon atoms, and $R_3$ is hydrogen, lower alkyl, cycloalkyl of 3 to 7 carbon atoms or phenyl and physiologically acceptable acid addition salts thereof.

2. A compound as in claim 1 wherein $R_2$ is cyclohexyl.
3. A compound as in claim 1 wherein $R_1$ is lower alkyl $R_2$ is cyclohexyl.
4. A compound as in claim 1 wherein the lower alkyl group is ethyl, $R_1$ is methyl and $R_3$ is hydrogen.

References Cited
UNITED STATES PATENTS
2,965,643  12/1960  Druey et al. _____ 260—256.4
3,211,732  10/1965  Schmidt et al. _____ 260—256.4

FOREIGN PATENTS
937,723  9/1963  Great Britain.

ALEX MAZEL, Primary Examiner
R. V. RUSH, Assistant Examiner

U.S. Cl. X.R.
260—310 R, 465 D, 465.4; 424—251